United States Patent [19]

Ferrando et al.

[11] 4,215,190

[45] Jul. 29, 1980

[54] LIGHTWEIGHT BATTERY ELECTRODE

[76] Inventors: William A. Ferrando, 3615 N. Vacation La., Arlington, Va. 22206; Raymond A. Sutula, 6301 Kaybro St., Laurel, Md. 20810

[21] Appl. No.: 46,976

[22] Filed: Jun. 8, 1979

[51] Int. Cl.² .................... H01M 4/24; H01M 4/74
[52] U.S. Cl. .................... 429/222; 429/223; 429/235; 429/241; 429/245
[58] Field of Search ............ 429/233, 235, 241, 245, 429/222, 223, 208; 204/294

[56] References Cited

U.S. PATENT DOCUMENTS

| | | | |
|---|---|---|---|
| 2,616,165 | 11/1952 | Brennan | 429/223 X |
| 2,627,531 | 2/1953 | Vogt | 429/222 X |
| 2,834,825 | 5/1958 | Wenzelberger | 429/223 X |
| 3,055,963 | 9/1962 | Krebs | 429/245 X |
| 3,262,815 | 7/1966 | Langer et al. | 429/235 X |
| 3,266,936 | 8/1966 | Krebs | 429/235 |
| 3,476,604 | 11/1969 | Faber | 429/241 X |
| 3,819,413 | 6/1974 | Nippe et al. | 429/235 X |

*Primary Examiner*—Anthony Skapars
*Attorney, Agent, or Firm*—R. S. Sciascia; A. L. Branning; R. D. Johnson

[57] ABSTRACT

An electrode grid comprising a sintered mat or felt of graphite fibers which are coated with a mixture of from about 85 to less than 100 weight percent of nickel and from more than zero to about 15 weight percent of phosphorous, the graphite fibers having a density greater than 1.8 gm/cm³. The grid is attached to an electrical connector and then impregnated with an active material such as nickel hydroxide or cadmium hydroxide to form an electrode.

13 Claims, 2 Drawing Figures

VOLTAGE-TIME CURVES FOR STANDARD (COMMERCIAL) AND EXPERIMENTAL PLATES (LOAD 1/2 Ω)

LIGHTWEIGHT BATTERY ELECTRODE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to electrochemical cells and more particularly to sintered nickel plates for electrochemical cells.

In the nickel-cadmium alkaline cell, porous nickel plates are used to construct both the positive and negative electrodes. The active material for the positive and negative electrodes is contained within the nickel plates. The positive plate contains nickel hydroxide while the negative plate contains cadmium hydroxide. The most efficient structural construction is the sintered nickel plate. This plate is designed for a high surface area to plate volume ratio. To form the plates, fine nickel powder (carbonyl nickel) on a wire screen is placed in a mold and sintered at elevated temperatures (700°–1000° C.) in a reducing atmosphere. The result is a plate (plaque) about 0.030–0.060 inches thick and 70–85% void (porosity).

Sintered nickel plates are lighter and have greater effective areas than do solid nickel plates. However, sintered nickel plates are limited by several factors to certain minimum weights. For example, very high porosities produce a structurally weak plaque which cannot endure the electrical stresses involved in impregnation and cycling. On the other hand if large cavities (pockets) are designed into the plate to hold significant amounts of active material, the problem becomes one of maintaining sufficient electrical conductivity.

In U.S. Pat. No. 3,476,604 entitled "Method of Making an Electrode Grid," issued to Peter Faber on Nov. 4, 1969, an electrode grid is formed by sintering a web of nickel-boron coated carbonaceous fibers. In that method, a fabric or felt of cellulose fibers was first charred to produce a web of carbonaceous filaments. These carbonaceous filaments were then at least partially graphiticized. Next, an aqueous solution of a nickel salt in the presence of a reducing boron compound was used to deposit a nickel-boron coating on the carbonaceous filaments. Finally, the web of nickel-borom coated carbonaceous filaments was sintered to form the nickel electrode grid.

There are several disadvantages to this prior art approach. First, if carbon or graphite fibers formed by charring materials such as rayon or cellulose fibers are used to produce the sintered nickel electrode grids, the grids swell upon cycling in an alkaline (e.g., KOH) electrolyte. Additionally, carbon or graphite fibers formed in this manner are expensive. Finally, the high purity reducing boron compounds required in the Faber process are very expensive. The less expensive phosphorous reducing compounds have not been tried in the prior art because it was thought that phosphorus codeposited with the nickel on the fibers would prevent the proper operation of the nickel electrode. In other words, although inert boron does not interfere with the electrochemical reactions of the nickel electrode, reactive phosphorous was expected to interfere and make the cell impractical.

SUMMARY OF THE INVENTION

Accordingly, one object of this invention is to provide novel sintered nickel electrode grids.

Another object of this invention is to provide lightweight nickel electrode grids.

Still another object of this invention is to provide lightweight nickel electrode grids which do not swell significantly upon cycling of the cell.

Another object of this invention is to provide low cost lightweight nickel electrode grids.

Yet another object of this invention is to provide novel cadmium electrodes.

These and other objects of this invention are accomplished by providing an electrode grid comprising a mat of graphite fibers wherein the graphite fibers are coated with a mixture of from about 85 to less than 100 weight percent nickel and from more than zero to about 15 weight percent of phosphorous, the density of the graphite fiber being greater than 1.8 gm/cm$^3$. The nickel grid may be impregnated with nickel oxide to form a nickel electrode or with cadmium oxide to form a cadmium electrode.

BRIEF DESCRIPTION OF THE DRAWINGS

A more complete understanding of the invention and many of the attendant advantages thereto will be readily appreciated as the same becomes better understood by reference to the following detailed description when considered in connection with the accompanying drawings wherein.

DETAILED DESCRIPTION OF THE PREFERRED EMBODIMENT

Figure 1:
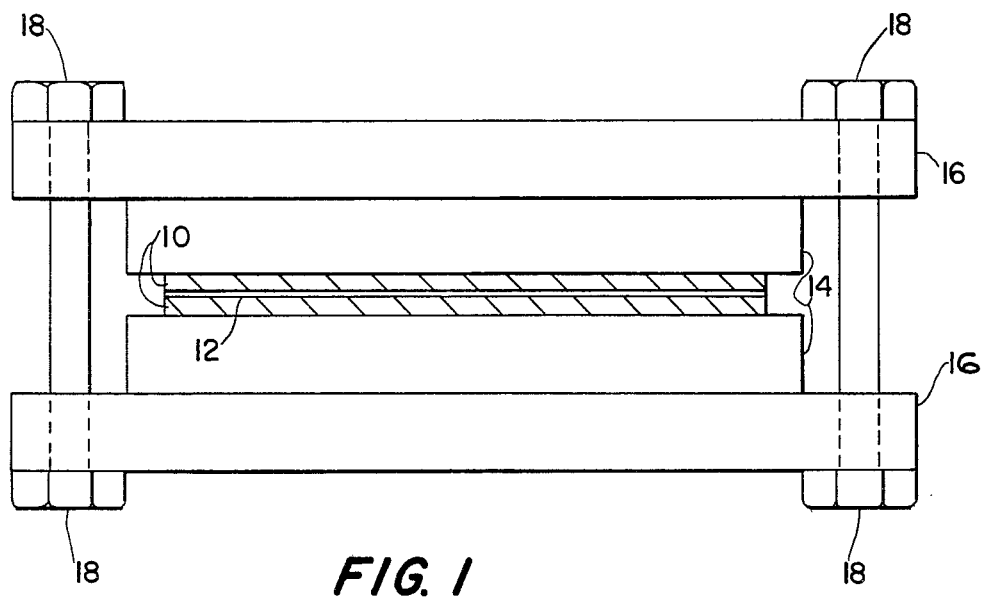
FIG. 1 is a side view of the apparatus used to produce the electrode grids in the Examples.

The nickel electrode grid is prepared by coating high density graphite fibers in the form of a mat or web with a mixture of nickel and phosphorous and then sintering the coated fibers.

"High density graphite fibers" refer to fibers having a density of more than 1.80 gm/cm$^3$, preferrably more than 1.90 gm/cm$^3$, and more preferrably more than 1.95 gm/cm$^3$. The theoretical maximum density for graphite is 2.1 gm/cm$^3$.

An example of a suitable graphite fiber is available from the Union Carbide Corporation, Carbon Products Division under the trade name "Thornel", Type P mat, Grade VMA. Union Carbide technical information bulletin NO. 465-225 describes "Thornel" mat grade VMA as "composed of high-strength, high-modulus carbon or graphite filaments in a random-layered orientation. The fine diametered filaments are one to three inches long and are mechanically bonded to form a continuous web of material 0.4 inches thick, 22 inches wide that is supplied in rolls approximately 40 feet long." The bulletin also lists the following properties for "Thornel" mat grade VMA:

TABLE 1

| TYPICAL PROPERTIES AND CHARACTERISTICS OF "THORNEL" MAT GRADE VMA | |
|---|---|
| PROPERTY | U.S. CUSTOMARY UNITS-VALUE |
| Filaments | |

TABLE 1-continued
TYPICAL PROPERTIES AND CHARACTERISTICS OF "THORNEL" MAT GRADE VMA

| PROPERTY | U.S. CUSTOMARY UNITS-VALUE |
| --- | --- |
| Tensile Strength lb/in$^2$ | 200,000 |
| Tensile Modulus × 10$^6$lb/in$^3$ | 35 |
| Density lb/in$^3$ | .072 |
| Electrical Resistivity 10$^4$ohm-cm | 12 |
| Diameter $\mu$ | 9 |
| Surface Area m$^2$/g | 0.4 |
| Carbon Assay % | 98 |
| pH — | 6 |
| Mat | |
| Areal Density lb/ft$^2$ | 0.07 |
| Bulk Density lb/ft$^3$ | 2.25 |
| Tensile Strength (long) lb/in width | 0.8 |
| Tensile Strength (trans.) lb/in width | 0.8 |
| Electrical Resistivity (trans.) 10$^4$ ohmcm | 7000 |
| Thermal Conductivity thickness BTU in/h/ft$^2$°F. | 0.24 |

William E. Chambers in an article entitled "Low-cost High-performance Carbon Fibers," *Mechanical Engineering*, December 1975, pp. 38–39 describes the process for making the "Thornel" Type P (pitch) carbon fibers. The dimensions of the fibers are not a critical feature of this invention, but rather are chosen for certain practical reasons. For example, the smaller the diameter of the fiber, the larger the effective area of the sintered nickel grid will be. Thus, it is contemplated that fibers with diameter less that the 9 microns may be used. On the other hand, short fibers will produce sintered nickel grids that require support screens and thus added weight. Tests have demonstrated that longer fibers (e.g., one to three inches ) produce sintered nickel grids which do not require support screens.

Carbon or graphite fibers produced by charring or graphiticizing rayon, cellulose, or similar fibers have low densities and therefore are not suitable for this invention. Sinter nickel-coated grids made of these fibers swell and disintergrate during cycling of alkaline nickel cells. Unlike the dense graphite or carbon fibers used in the present invention, these lower density fibers appear to have larger pores or fissures which are not fully protected by the nickel coating from attack by the KOH electrolyte.

Unexpectedly, it has now been found that the phosphorus in the nickel-phosphorus coating does not significantly interfere with the electrochemical reactions of nickel-cadmium cells.

Typically, the Type P, matte grade VMA fibers, which varied between 2.0 and 4.35 gms, were washed in hot deionized (6 meg ohm) water and then soaked in dilute hydrochloric acid for about 5 minutes. The matte was immersed in Shipley Catelyst 9F, a substrate sensitizing solution whose main components are palladium and stannous chlorides, for about 3 minutes. Then the fibers were washed twice in deionized (6 meg ohm) water and placed in a Shipley Accelerator number 19 for about 3 minutes at a temperature of 50°–60° C. The accelerator number 19 is a substrate activating solution whose principal components are a non-oxidizing mineral acid containing several organic compounds.

R. G. Wedel in "The Durability and Structure of Electroplated Plastics-Part 4," *Finishing Highlights*, July/August, 1978, P. 29 explains that " . . . The action of the accelerator is probably the removal of excess tin salts from the catalyst particles. Any remaining Palladium (II) may be reduced to active metallic palladium . . . "

" . . . Other factors affecting activation are the catalyst and accelerator treatment times which must be balanced for best results, and the rinse after acceleration which does not strongly affect catalytic activity although too long rinses may deactivate the catalyst since the catalytic solution may decompose . . . "

The matte was rinsed twice with deionized (6 meg ohm) water and placed in an acid nickel plating bath at about 80°–85° C. Two different plating baths were used: (1) the ALLIED-KELITE Electroless nickel composed of the following materials which were mixed in the order and proportions given: 385 ml H$_2$O (6 meg-ohm), 80 ml NIKLAD 794A, 150 ml NIKLAD 794 B, and 385 ml H$_2$O (6 meg-ohm); and (2) a solution composed of 30 g nickel chloride hydrate, 50 g sodium hydroxyacetate, 10 g sodium hypophosphite hydrate, and H$_2$O (6 meg-ohm) to make 1000 ml. Both plating solutions produce a nickel coating that contains between 9 to 14% phosphorous. The preferred plating solution was that obtained from ALLIED-KELITE (solution 1). The thickness of the nickel coating on the substrate depended on the temperature of the bath and the length of time the substrate remained in contact with the plating solution. Usually 81° C. and 15 minutes in contact with the plating solution (600 ml) produced a coating that was about 0.5 nm thick. Afterwords the nickel-phosphorous coated matte was washed twice in deionized (6 meg ohm) water, rinsed in acetone, and air dried with the electrochemical reactions of nickel-cadmium cells.

The general nature of the invention having been set forth, the following example is presented as a specific illustration thereof. It will be understood that the invention is not limited to this specific example, but is susceptible to various modifications that will be recognized by one of ordinary skill in the art.

EXAMPLE 1

A 5⅞"×2¾"×¼" pad of Thornel, Type P, matte grade VMA fibers (union Carbide Corporation) was coated with a mixture of nickel and phosphorous. The following procedure was used—a suitable coating of about 0.5 nm was produced on the fibers. The electroless nickel used produces a coating containing about 9 atomic percent phosphorous. The presence of the phosphorous affects the sintering temperature of the nickel since the nickel and phosphorous form an eutectic which melts about 900° C. The sintering temperature for the nickel-coated fibers was found to be about 825° C.

EXAMPLE 2

Forming the electrode plaque

Referring to FIG. 1, one piece (5⅞"×2¾"×¼") of coated matte fiber 10 produced according to examples 1 was placed on each side of a stainless steel screen 12. This sandwich was placed between two ceramic tile plates 14 which were then placed between two stainless steel plates 16. The stainless steel plates 16 were then compressed in a carver hydrolic press until the thickness of the sandwich of coated matte fiber 10 and stainless steel screen was from 0.020 to 0.035 inches. The stainless steel plates 16 were then bolted together with bolts 18 to maintain the compression on the sandwich during sintering. The coated matte fiber was sintered for several hours at 825° C. in a hydrogen (reducing)

atmosphere. One plate (number 4) was successfully compressed and sintered using thin nickel strips instead of the stainless steel screens indicating that the plate can be made lighter by minimizing the weight of the screen used. Furthermore, the ceramic tiles may be replaced by coating the stainless steel plates with $M_gO$, a parting agent.

After sintering, the plaques were found to be integral and uniform in thickness. Plaques produced by the method have a porosity of 50 to 65% as determined by water imbibition. The electrical conductivity of the plaques was measured at various points and ranged between 30 to 60 $\mu\Omega$ whereas the electrical resistivity of pure nickel has a value between 15 and 20 $\mu\Omega$ m.

EXAMPLE 3

Adding the nickel hydroxide active material

Plaques obtained according to Example 2 were impregnated with the active materials and converted to the hydroxides using a process first developed by R. L. Beauchamp, Electrochemical Society Fall Meeting, Extended, abstracts, #65, October 1970, pp. 161 at the Bell Telephone Laboratories and later refined by D. F. Pickett, "Fabrication and Investigation of Nickel-Alkaline Cells," Part I, AFAPL-TR-75-34, 1974 at the Air Force Aero-Propulsion Laboratory. Typically, the plaque was placed between two stainless steel or nickel anodes separated by a space of about ½ inch. This was accomplished by using a holding frame constructed from plexiglass. The frame was placed in a 50 v/o water-ethanol solution containing 1.8 molar nickel nitrate and 0.2 molar cobalt nitrate, and the plaque was then cathodized at 0.50 amperes/in² for a period of about 1½ to 2½ hours. Afterwards the frame was removed from the solution, rinsed with distilled water, and placed in a room temperature solution of 35 wt/o potassium hydroxide. Cathodization of the plaque was performed in this medium at a current of 0.50 amperes/in² for about 20 minutes. Polarity was then reversed and the plaque anodized using the same current-time conditions. This cathodization-anodization process was repeated one to five times after which the plaque was washed in room temperature distilled water, overnight, with good circulation, dried, and then weighed.

EXAMPLE 4

Testing of the charge electrodes

Experimental test cells were constructed in which the plate (impregnated and converted plaque) was wrapped in several layers of woven nylon and sandwiched between two commercial cadmium plates. For comparison of capacities a standard cell, which had the same length and width as the experimental test cells, was constructed using commercially available nickel-cadmium plates. Two cadmium plates were used in all the cells to insure that cell discharges would be limited by the positive plate. The experimental and commercial cells were subjected to the same cycle regime. They were charged for 1½ hours at a constant current of 4.0 amperes and then discharged through a standard ½Ω resistor to a cutoff voltage of 0.90 volt.

Figure 2:
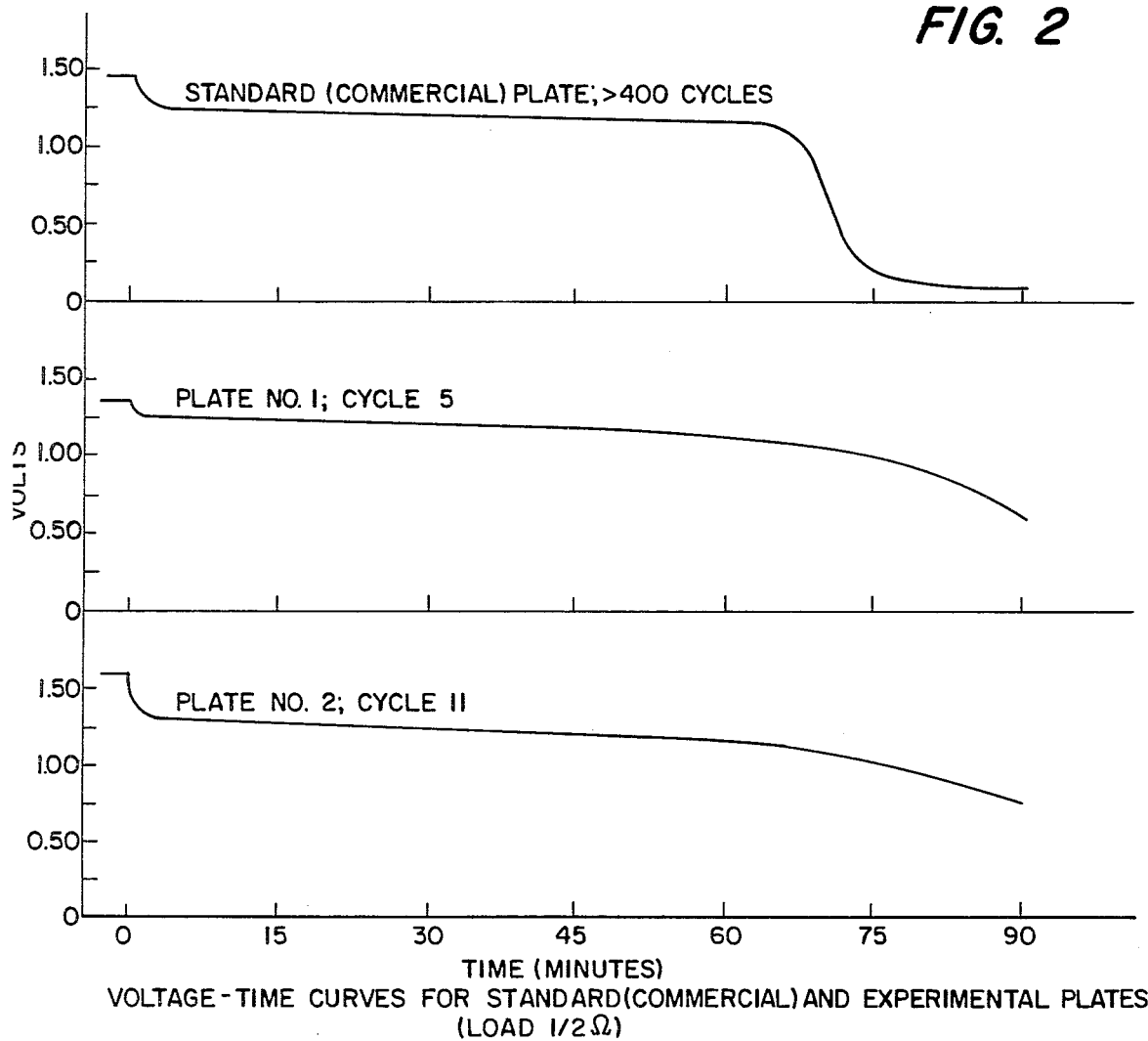
FIG. 2 shows the discharge curves for a standard commercial nickel plate and for two of the nickel plates of this invention.

For the experimental test cells the charge voltage (1.65 v) was about 0.08 volt higher than that of the standard (commercial) cell whereas the average discharge voltage (1.15 v) was about 0.05 volt lower. These differences in the charge-discharge voltages may be due to the presence of the carbon matte fiber and its effect on cell potential. Typical discharge curves for the standard (commercial) and experimental cells are shown in FIG. 2. Note that the sharp break that occurs in the standard (commercial) cell does not occur in the experimental test cells. Table 2 summarizes the data obtained on the standard (commercial) and experimental plates.

The impregnated dry weight of plates one through four are lighter than the commercial plate, the amp-hrs/lb is higher and the total amount of nickel used is lower for the experimental plates than for the commercial plate indicating that a significant weight reduction can be achieved while maintaining a greater capacity than the commercial plate.

TABLE 2

| | Comparison of Experimental and Standard (commercial) Plates | | | | | |
|---|---|---|---|---|---|---|
| Plate | Unimpregnated Dry Weight | Weight of Carbon Matte Fibre | Nickel Coating Thickness (microns) | Porosity | Impregnated Dry Weight | Thickness (inch) Before Impreg. |
| 1 | 14.05g | 2.4g | 0.834 | 54% | 28.85g | 0.050–0.060 |
| 2 | 10.65g | 2.0g | 0.753 | 61.75% | 21.25g | 0.040–0.045 |
| 3 | 14.7g | 4.35g | 0.522 | 64.4% | 27.8g | 0.040–0.057 |
| 4 | 8.93g | 2.82g | 0.500 | 58.9% | 15.14g | 0.035 |
| standard (commercial) | ~24g | N/A | N/A | ~75% | 33.9g | ~0.030 |

| Plate | Thickness (inch) After Impreg. | No. of Charge Discharge Cycles | Length of Discharge Compared* to Standard (commercial) Plate | AMP-HR*/LB |
|---|---|---|---|---|
| 1 | 0.060–0.075 | 5 | 121% | 48.1 |
| 2 | 0.045–0.050 | 14 | 94% | 49 |
| 3 | 0.050–0.065 | 3 | 109% | 45 |
| 4 | 0.040–0.042 | 10 | 75.7% | 57.2 |
| Standard (commercial) | 0.033 | 400 | 100% | 37.6 |

| Plate | Total Amount of Nickel Used to Fabricate Plate Compared to Standard (commercial) Plate |
|---|---|
| 1 | 78% |
| 2 | 57 |
| 3 | 69 |
| 4 | 36% |
| Standard | 100% |

TABLE 2-continued

Comparison of Experimental and Standard (commercial) Plates (commercial)

*Load: a standard ½ resistance
**Obtained from discharge curves

It must be emphasized that the experimental plates have not been optimized. A comparison of FIG. 1 with FIG. 3 indicates that the small matte fiber diameter and thinner nickel coatings would result in greater increases in performance than documented here.

As will be evident to those skilled in the art, various modifications can be made, or followed, in the light of the foregoing disclosure and discussion, without departing from the spirit or the scope of the disclosure or the scope of the claims.

What is claimed as new and desired to be secured by Letters Patent of the United States is:

1. An electrode grid comprising:
  a mat of graphite fibers wherein the graphite fibers are coated with a mixture of from about 85 to less than 100 weight percent nickel and from more than zero to about 15 weight percent phosphorous, the density of the graphite being greater than 1.8 gm/cm$^3$.
2. The electrode grid of claim 1 wherein the mat of nickel coated graphite fibers is sintered.
3. The electrode grid of claim 2 wherein the density of the graphite is greater than 1.9 gm/cm$^3$.
4. The electrode grid of claim 3 wherein the density of the graphite is greater than 1.95 gm/cm$^3$.
5. The electrode grid of claim 2 wherein the graphite fibers are coated with a mixture of from 90 to 95 weight percent nickel and from 5 to 10 weight percent phosphorous.
6. A nickel electrode comprising:
  (1) a sintered mat of graphite fibers wherein the graphite fibers are coated with a mixture of from about 85 to less than 100 weight percent of nickel and from more than zero to about 15 weight percent phosphorous, the density of the graphite being greater than 1.8 gms/cm$^3$;
  (2) a current colector attached to the sintered mat of nickel-phosphorous coated graphite fibers; and
  (3) the sintered mat of nickel-phosphorous coated graphite fibers being impregnated with nickel oxide.
7. The nickel electrode of claim 6 wherein the density of the graphite is greater than 1.9 gm/cm$^3$.
8. The nickel electrode of claim 7 wherein the density of the graphite is greater than 1.95 gm/cm$^3$.
9. The nickel electrode of claim 7 wherein the graphite fibers are coated with a mixture of from 90 to 95 weight percent nickel and from 5 to 10 weight percent phosphorous.
10. A camdium electrode comprising:
  (1) a sintered mat of graphite fibers wherein the graphite fibers are coated with a mixture of from about 85 to less than 100 weight percent of nickel and from more than zero to about 15 weight percent phosphorous, the density of the graphite being greater than 1.8 gms/cm$^3$;
  (2) a current colector attached to the sintered mat of nickel-phosphorous coated graphite fibers; and
  (3) the sintered mat of nickel-phosphorous coated graphite fibers being impregnated with cadmium oxide.
11. The cadmium electrode of claim 10 wherein the density of the graphite is greater than 1.9 gm/cm$^3$.
12. The cadmium electrode of claim 11 wherein the density of the graphite is greater than 1.95 gm/cm$^3$.
13. The cadmium electrode of claim 10 wherein the graphite fibers are coated with a mixture of from 90 to 95 weight percent nickel and from 5 to 10 weight percent phosphorous.

* * * * *